March 22, 1932.  C. K. MALOTT  1,850,590
TESTING DEVICE FOR ELECTRICAL SYSTEMS
Filed Jan. 21, 1928  2 Sheets-Sheet 2
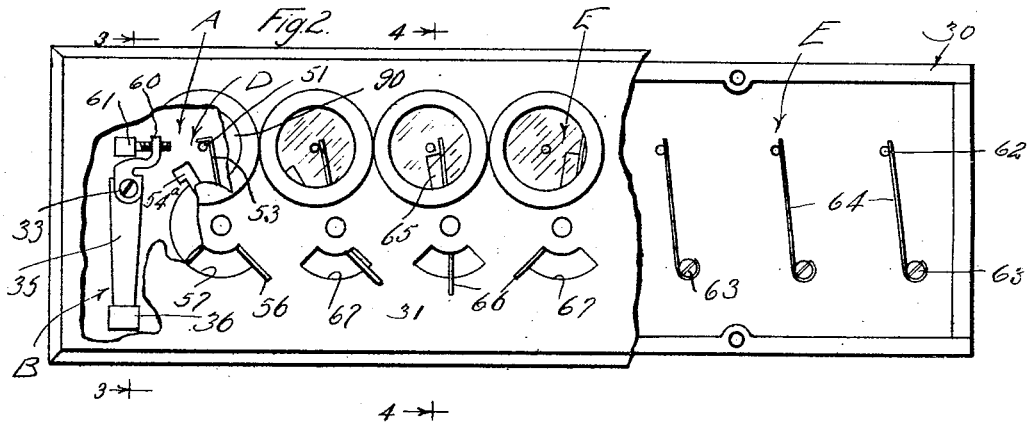
Inventor
Charles K. Malott
by his Attorney Patented Mar. 22, 1932

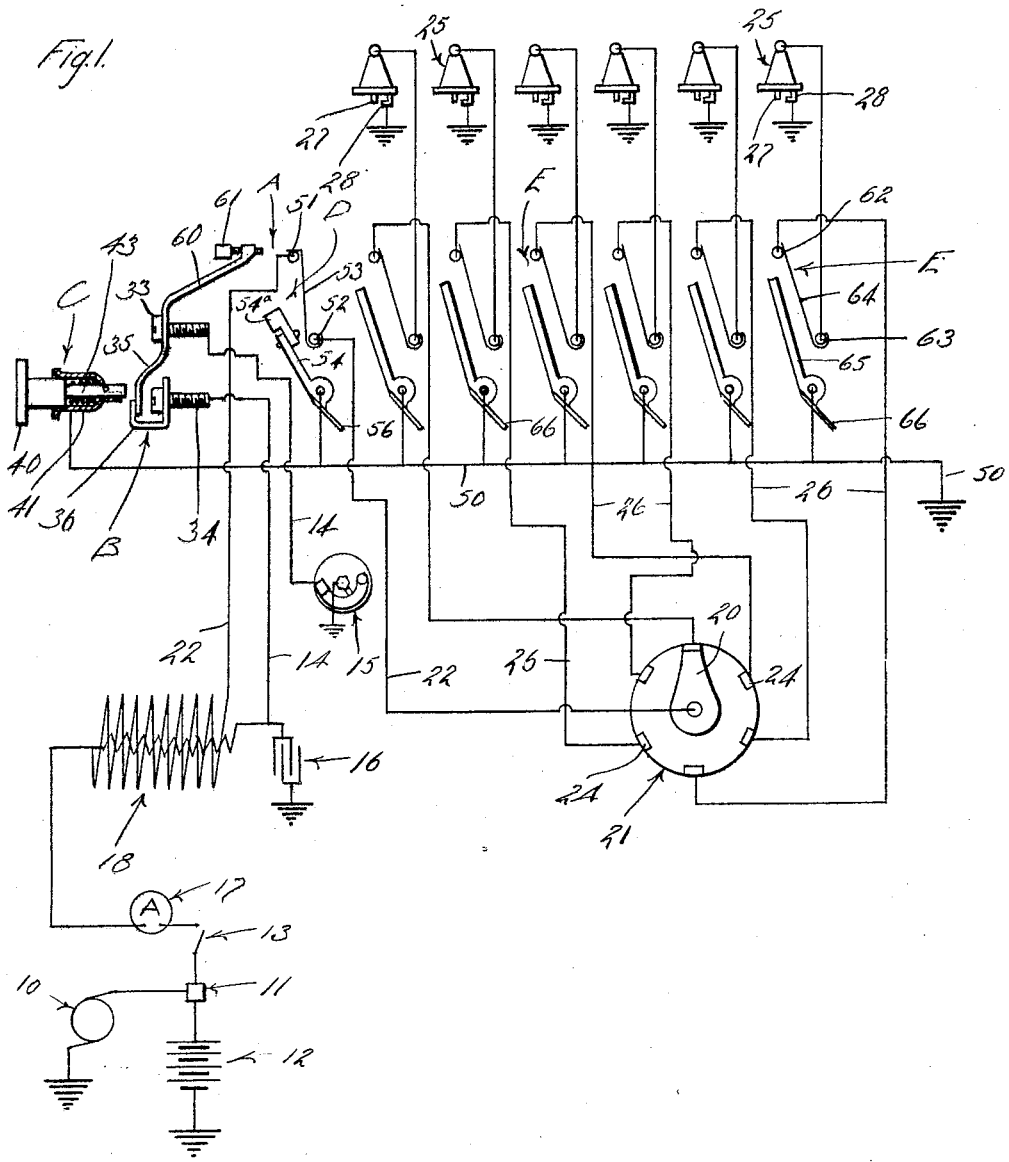

1,850,590

UNITED STATES PATENT OFFICE

CHARLES K. MALOTT, OF LOS ANGELES, CALIFORNIA

TESTING DEVICE FOR ELECTRICAL SYSTEMS

Application filed January 21, 1928. Serial No. 248,303.

This invention has to do with a testing device for an electrical system and has particular reference to a device for testing an ignition system of an internal combustion engine. It is a general object of my invention to provide a simple, practical and effective means for testing the various parts of an ignition system to determine whether or not the system is in proper operating condition and/or to locate trouble.

The ignition systems commonly employed in multiple cylinder internal combustion engines are complicated and it is usually difficult to determine whether or not they are in proper operating condition or to locate trouble. The usual ignition system of an internal combustion engine of the automobile type, or the like, involves the handling of a low tension current through a transformer or spark coil and an interrupter or timer, the handling of the high tension current from the spark coil by a distributor so that the high tension current is directed to the proper cylinder of the engine, and sparking devices or spark plugs at the cylinders of the engine handling the high tension current to produce sparks for igniting the fuel in the cylinders. A system of this kind involves various parts that must be kept in efficient operating condition and proper adjustment. For example, the spark coil must operate to deliver the desired high tension current, the points of the timer must be clean and properly adjusted, the connections in the distributor must be clean and properly insulated and the spark plugs must be clean and properly adjusted. Further it is common to provide various protective or auxiliary devices in ignition systems, for instance, condensers are connected in circuit with the timer and various other devices and parts are found in ignition systems of different makes.

It is a primary object of this invention to provide a testing device for an ignition system of the character mentioned whereby the adjustment and operation of the various parts of the systems can be readily tested.

Another object of the invention is to provide a testing device of the character mentioned whereby defects or trouble in the ignition system can be easily and quickly located without exposing the operator to shocks from the high tension current.

It is another object of this invention to provide a testing device of the character mentioned suitable for portable use or permanent application to or installation in an ignition system. The instrument is suitable for mounting on an instrument board such as the instrument board of a motor vehicle, or the like.

It is a further object of my invention to provide various improved practical and efficient parts in a testing device of the character mentioned.

The various objects and features of my invention will be best and more fully understood from the following detailed description of a typical form and application of the invention throughout which description I refer to the accompanying drawings, in which:

Fig. 1 is a diagrammatic view illustrating the device provided by this invention operatively connected in a typical ignition system. Fig. 2 is a face view of the instrument with certain parts broken away.

Fig. 3 is an enlarged transverse sectional view taken as indicated by line 3—3 on Fig. 2, and Fig. 4 is an enlarged detail sectional view taken as indicated by line 4—4 on Fig. 2.

For the purpose of facilitating an understanding of my invention I have illustrated it in connection with a typical form of ignition system commonly used on multiple cylinder internal combustion engines suitable for motor vehicles, air planes, motor boats, etc. This particular ignition system includes, generally, a source of low tension electrical energy such as a generator 10 having one pole grounded and the other connected with a relay control 11 connected with a battery 12 and a main control switch 13. The main control switch 13 controls the flow of low tension current through the transformer or spark coil 18. A line 14 carries the low tension current, passing through the coil, to the timer 15. The timer has a movable contact which is grounded, thus completing the low tension circuit when the contacts of the timer are together. A condenser 16 is connected between the line 14 and ground. In accordance with standard practice an ammeter 17 is connected in the low tension line. One terminal of the high tension winding of the spark coil 18 is grounded, for instance, connected with the low tension circuit to pass through this circuit to ground while the other terminal is connected by a line 22 with the distributing arm 20 of the distributor 21. The distributing arm 20 is operated, for instance, rotated to successively engage stationary contacts 24 connected with the several spark plugs 25 of the engine by distributing lines 26. In accordance with standard practice each spark plug 25 has an insulated terminal or point 27 connected with the distributing line and a grounded contact or point 28. With this arrangement the space between the points 27 and 28 of the spark plug forms a gap across which the high tension current jumps to complete its circuit to ground. The operation of this type of system is well known; it being apparent that the breaking or opening of the low tension circuit by the timer 15 results in a discharge of high tension current by the transformer which high tension current is distributed to the desired spark plug 25 through the action of the distributor 21 and jumps the gap between the spark plug points, thus igniting the fuel in the engine.

The testing instrument provided by my invention includes, generally, a safety gap A for allowing the high tension current from the spark coil to jump to ground instead of going to the distributor, in the event that an excessive resistance develops between the coil and the distributor or at any point between the coil 18 and the spark plug 25 if the gap switches E (to be subsequently described) are not present or if the gap of a certain switch E is not greater than gap A, a switch B for controlling the low tension current from the coil 18 to the timer 15, operating means C for the switch B, an adjustable gap switch D in the line 22 between the high tension winding of the coil 18 and distributor arm 20, and individually operable adjustable gap switches E in the distributing lines 26 between the stationary contacts 24 of the distributor and the insulated points 27 of the spark plugs 25.

The testing devices, i. e. the various parts just referred to are preferably incorporated in a single unitary instrument suitable for mounting at the engine or at an instrument board, or the like. In accordance with my construction the instrument preferably includes a body 30 of insulating material forming a mounting or carrier for the various parts of the instrument requiring insulation and a cover plate 31 for the body formed of metal and forming a carrier for the grounded or commonly connected parts of the instrument.

The body 30 is preferably a rectangular box-like structure open at its front and proportioned to properly house the various switches included in the device. The cover 31 is preferably a finished part forming a closure for the body 30 as shown in the drawings.

The switch B is provided in the low tension circuit between the spark coil 18 and timer 15 and includes two space poles 33 and 34 carried by the body of the instrument. A movable contact 35 is connected with the pole 33 and a stationary contact 36 is connected to the pole 34. The movable contact 35 of the switch B may be a simple spring contact. The stationary contact 36 is mounted and designed to have two spaced parts to receive the contact 35. Contact 35 normally engages one part of the contact 36 and is operable through a neutral or open position into engagement with the other part of the contact 36. In the particular construction illustrated the head of the terminal post 34 forms a part of the stationary contact to be engaged by the contact 35 after it has been operated through the neutral position. With this construction the switch B is normally closed and can be actuated to open and then reclose. The operating means C provided for the switch B preferably includes a push button 40 projecting from the cover 31 of the instrument and mounted in a guide 41 so that it is normally held unactuated by a spring 42. Button 40 is carried by a stem 43 adapted to engage the movable contact 35 to operate it. The parts of the operating means 43 are grounded, for instance, mounted in direct contact with the cover 31 of the instrument, which in turn is grounded through a suitable connection 50. As the push button 40 of the operating means C is depressed the stem 43 engages the movable contact 35, thus grounding the contact 35. Further depression of the push button disconnects the contact 35 from the stationary contact 36, thus opening the low tension circuit to the timer. Further depression causes the contact 35 to engage the other part of the contact 36, thus closing the low tension circuit. When the push button 40 is released this operation is reversed. The stem 43 is provided with a lock pin 43a whereby the stem can be set in position where the switch B is open. Turning of the push button 40 controls the operation of the lock pin.

The switch D connected in the high tension line between the spark coil 18 and distributor arm 20 is an adjustable gap switch normally closed and capable of being operated to establish a gap in the high tension line from the coil 18 to the distributor 21. In accordance with my invention the switch D includes two spaced contacts or terminals 51 and 52 mounted in the part of the instrument, a movable member 53 normally connecting the contacts 51 and 52 and an operating member 54 carried by the cover 31 of the instrument and operable to open the connection between the contacts 51 and 52 and establish a gap between them. In the preferred arrangement the contact 51 is connected with the high tension winding of the coil 18 while the contact 52 is connected with the distributor arm 20. The movable contact 53 is permanently attached to the contact 52 and is movable into and out of engagement with the contact 51. The movable contact 53 may be a spring contact normally engaging the contact 51. The operating member 54 is carried by the cover of the instrument so that it is grounded through the connection 50 and is operable to engage the contact 53 to move it out of engagement with the contact 51 establishing a gap between the coil and distributor. The operating member 54 is preferably pivotally carried by the cover 31, has a handle part 56 projecting through a segmental opening 57 in the cover and has an insulated part 54a that engages the movable contact 53 to prevent its grounding. The cover 31 is provided with a sight opening 90 through which the operation of the switch can be viewed.

The safety gap A provided in the high tension circuit between the coil 18 and distributor 21 may be established between the contact 51 and a contact 60 connected with the terminal 33 of the switch B. The contact 60 may be a fixed contact or it may include an adjustable part or screw 61 normally set in the desired spaced relation with reference to the terminal 51.

The switches E connected in the distributing lines 26 are adjustable gap switches and may correspond, generally, in construction and general mode of operation with the switch D. For example, in the drawings I have disclosed each switch E as comprising spaced terminals 62 and 63, a spring contact arm 64 carried by the terminal 63 and normally engaging the terminal 62. The terminal 63 is connected with the insulated point 27 of the spark plug while the terminal 62 is connected with the stationary contact 24 of the distributor. The operating member 65 is carried by and grounded with the cover of the instrument and has an operating handle 66 projected through a segmental opening 67 in the cover. In accordance with my invention the operating member 65 is proportioned and related with reference to the contact 62 and the movable contact 64 so that the shortest gap established upon opening of the contact 64 to its fully operated position is between the terminal or contact 62 and the operating member 65 and not between contact 62 and contact 64. With this arrangement the spring contact 64 is protected from deleterious effects of arcing that may occur when the gap is established. The movable contact 64 may be normally in engagement with the terminal 62 so that there is a complete circuit from the distributor to the spark plug, however, the operating member 65 can at any time be operated to move the contact 64 away from the terminal 62, thus establishing a gap in the circuit from the distributor to the ground. It will be apparent that this gap can be adjusted to the desired resistance, thus providing a means of testing the condition and capacity of the high tension circuit particularly between the distributor 21 and the spark plug 25.

The adjustable gap established between the distributor and ground together with the safety gap established in the high tension circuit from the coil 18 to the distributor provides a means of accurately testing the condition of the high tension circuit to its capacity. Further these gaps, together with the ammeter 17 and the switch B in the low tension circuit to the timer under control of the grounded operating means C, provide for discharging the coil and testing the various parts of the high tension circuit, as well as the parts of the low tension circuit.

In practice the operating parts 65 may be spaced from the contacts 62 so that arcing will occur between these parts rather than at Gap A in the event that increased resistance develops between the instrument and the grounded points of the plugs.

The device provided by this invention is capable of testing the functioning or action of practically any part or group of parts of typical ignition systems employed in multiple cylinder internal combustion engines. When all the parts of the device are embodied in a single unitary instrument, such as illustrated in Fig. 2 of the drawings, and the parts are connected to the parts of an ignition system as illustrated in Fig. 1 of the drawings, the operation of the device is as follows:

When it is desired to test the functioning of the coil 18, the operating member 54 is actuated until the insulated portion 54a engages the movable contact 53. The member 54 is further actuated to form a gap between the movable contact 53 and the contact 51. This gap may be varied until the maximum capacity of the coil to produce a spark is determined and as the capacity of the type of coil 18, to bridge a gap of a certain size, is known, it is readily determined whether the coil is functioning properly. To make this test and the following tests, the motor must be running or the motor may be turned over slowly provided the switch 13 is turned on.

To test the condition of the timer 15 and the condenser 16, the gap between the contacts 51 and 53 is set so that a spark of sufficient size for proper ignition will jump between the contacts 51 and 53. The push button 40 is pushed inward so that the stem 43 engages the movable contact 35 to break the contact between the movable contact 35 and the stationary contact 36, shutting out the timer 15. The movable contact 35 is then caused to engage the pole 34. The push button is then allowed to return to its normal out position. If the system is functioning correctly there will be three sparks jump between the contacts 51 and 53 during operation of the push button. If no sparks appear between the contacts 51 and 53, either the timer 15 is not functioning properly or the condenser 16 is not functioning.

If unusual resistance occurs in the high tension circuit, caused by a broken wire, loose connection, displaced distributor cap, too great a gap between the points of the spark plugs, or like cause, the circuit will jump the gap between the contacts 51 and 61. The gap between these contacts not only forms a safety gap in the high tension line, but also indicates the form of trouble and location of the trouble.

If the gap between the contacts 51 and 61 is made small and an average-sized spark is produced between the contacts 51 and 53, and no sparks jump between the contacts 51 and 61, it indicates that there is a ground in the portion of the high tension line between the contact 51 and the spark plug point 28. If under the same conditions unequally timed sparks jump the gap between the contacts 51 and 61, it indicates that one or more of the leads to the spark plugs are grounded. The spaces between the contacts 64 and the operating levers 65 may be made less than the space between the contacts 51 and 61 so that they form by-passes of less resistance than the by-pass formed by the contacts 51 and 61. In this manner it may be readily determined which spark plug lead line is grounded.

The operating members 64 may be individually actuated to engage the movable contacts 64. By this shunting out the spark plugs, one at a time, loose and/or worn motor parts can be readily located. The members 65 may be further advanced so that gaps are formed between the contact 64 and the terminals 62. In normal operation of the ignition system, gaps of the same size will jump between the contacts 51 and 53 and between the contacts 64 and the terminals 62. If the sparks produced between the contacts 64 and the terminals 62 are smaller or weaker than those produced between the contacts 51 and 53 it indicates that there is a loss of current in the line between the terminals 51 and 62. Testing gaps may be formed between the terminals 62 and the movable contacts 64 which are of great utility as they may be closed individually, thus separately shorting the spark plugs. Two separate gaps may be formed in each spark plug lead line, one between the member 65 and the contact 64, and one between the terminal 62 and the contacts 64.

The invention may be embodied in a testing device for dual ignition systems, and its application and functions are substantially the same as herein described. It is obvious that the device provided by this invention may be applied to various types of internal combustion engines, and that many functions, not herein described, will be evident to those skilled in the art.

Having described only a typical preferred form of my invention I do not wish to limit myself to the specific details set forth, but wish to reserve to myself any changes or variations that may appear to those skilled in the art or fall within the scope of the following claims.

Having described my invention, I claim:

1. A testing device for an electric system having a grounded low tension circuit operating through a transformer including a switch for connection in said circuit operable to open the circuit and including a stationary contact with spaced parts and a movable contact operable between said parts and normally in engagement with one of said parts, and operating means for the switch including a grounded operating member for operating the movable contact between said parts.

2. A testing device for an electric system having a grounded low tension circuit operating through a transformer including a switch for connection in said circuit operable to open the circuit and including a stationary contact with spaced parts and a movable contact operable between said parts and normally in engagement with one of said parts, and operating means for the switch including a grounded operating member for operating the movable contact between said parts, and means for setting the operating member in position to hold the movable contact spaced between the parts of the stationary contact.

3. A testing device for an electric system having a grounded low tension circuit operating through a transformer and a grounded high tension circuit from the transformer operating through a gap including, a switch in the low tension circuit operable to open the circuit, grounded operating means for the switch, and a grounding gap in the high tension circuit of greater resistance than the operating condition of the circuit.

4. A testing device for an electric system having a low tension circuit operating through a transformer and a high tension circuit from the transformer including, a disconnect switch in the low tension circuit operable to open the circuit, an adjustable gap switch in the high tension circuit, and a visible grounding gap in parallel with the high tension circuit of greater resistance than the operating condition of the circuit, the gap switch including a stationary contact, a movable contact, and an operating member for the movable contact insulated therefrom.

In witness that I claim the foregoing I have hereunto subscribed my name this 14th day of January, 1928.

CHARLES K. MALOTT.